United States Patent [19]

Vinyard

[11] 3,752,092
[45] Aug. 14, 1973

[54] SOIL WORKING APPARATUS
[76] Inventor: H. Owen Vinyard, Rt. 2, Box 75A, Hammond, La. 70401
[22] Filed: Oct. 1, 1971
[21] Appl. No.: 185,731

[52] U.S. Cl. .................. 111/7, 172/261, 172/451
[51] Int. Cl. ............................................ A01c 23/02
[58] Field of Search .................. 111/6, 7; 172/710, 172/264, 261; 280/423

[56] References Cited
UNITED STATES PATENTS

| | | | |
|---|---|---|---|
| 3,177,828 | 4/1965 | Cramer | 111/52 |
| 3,218,999 | 11/1965 | Pattison | 111/7 |
| 3,496,844 | 2/1970 | Evans | 111/7 |
| 2,722,902 | 11/1955 | Hyatt | 111/7 |
| 3,561,541 | 2/1971 | Woelfel | 172/710 X |
| 3,295,482 | 1/1967 | Dountas et al | 111/7 |
| 3,602,166 | 8/1971 | Peterson | 111/6 |

Primary Examiner—Robert E. Pulfrey
Assistant Examiner—Stephan C. Pellegrino
Attorney—Hofgren et al.

[57] ABSTRACT

Soil working apparatus including a frame equipped with soil working means which is mounted on the lifting arms of a tractor so that the arms may lower the soil working means to engage the soil or may lift the soil working means clear of the soil, and a trailer carrying auxiliary means that cooperates with the soil working means, the trailer having a gooseneck hitch that connects pivotally to the tractor forward of the lifting arms and that is of sufficient length and height to span the frame from front to rear and clear the frame in all positions of the lifting arms, and to clear the ends of the frame when the tractor is turned at a right angle to the trailer. Particularly, the soil working apparatus is an ammonia applicator and the auxiliary means is a tank of liquid ammonia.

2 Claims, 3 Drawing Figures

PATENTED AUG 14 1973 3,752,092
SHEET 1 OF 2
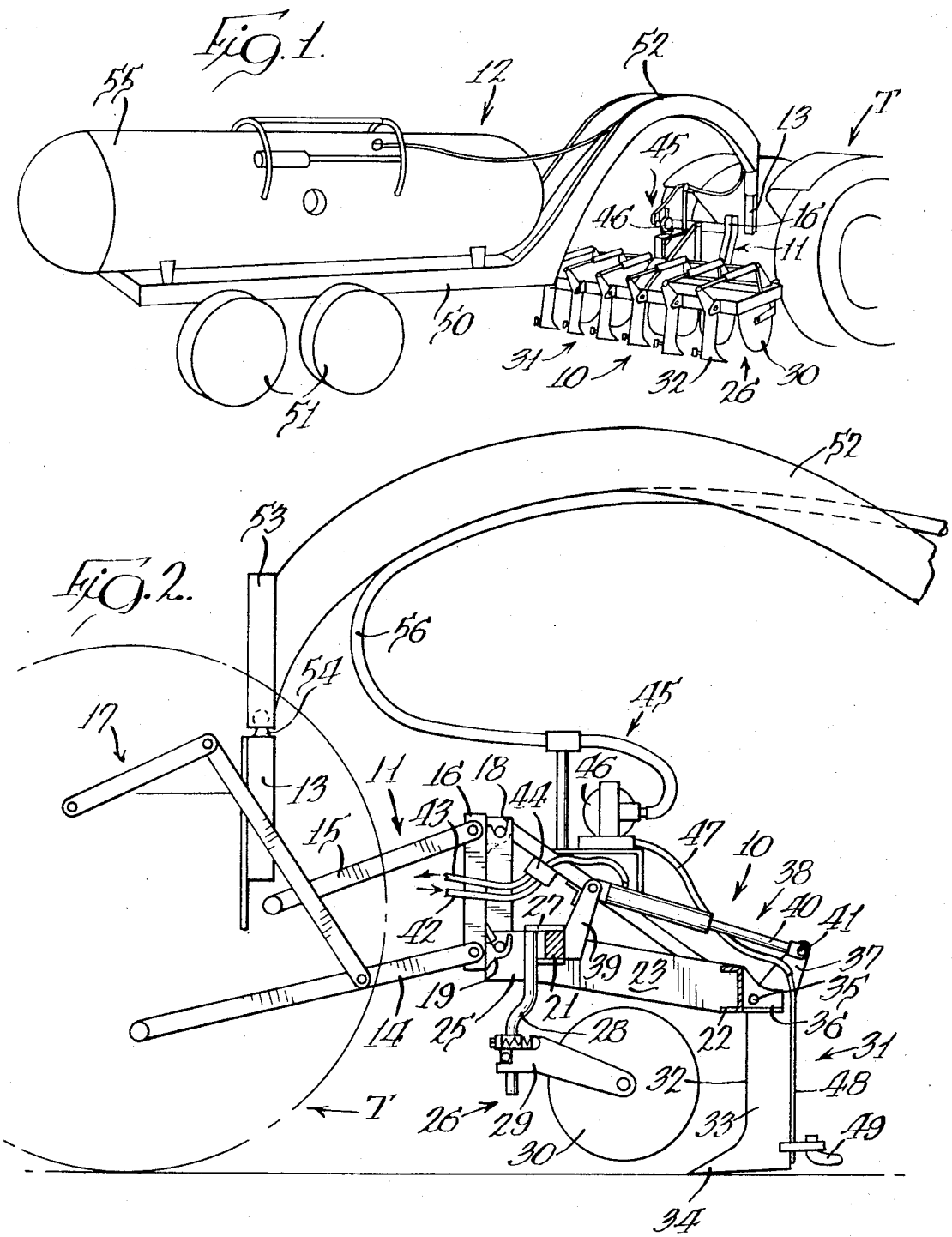

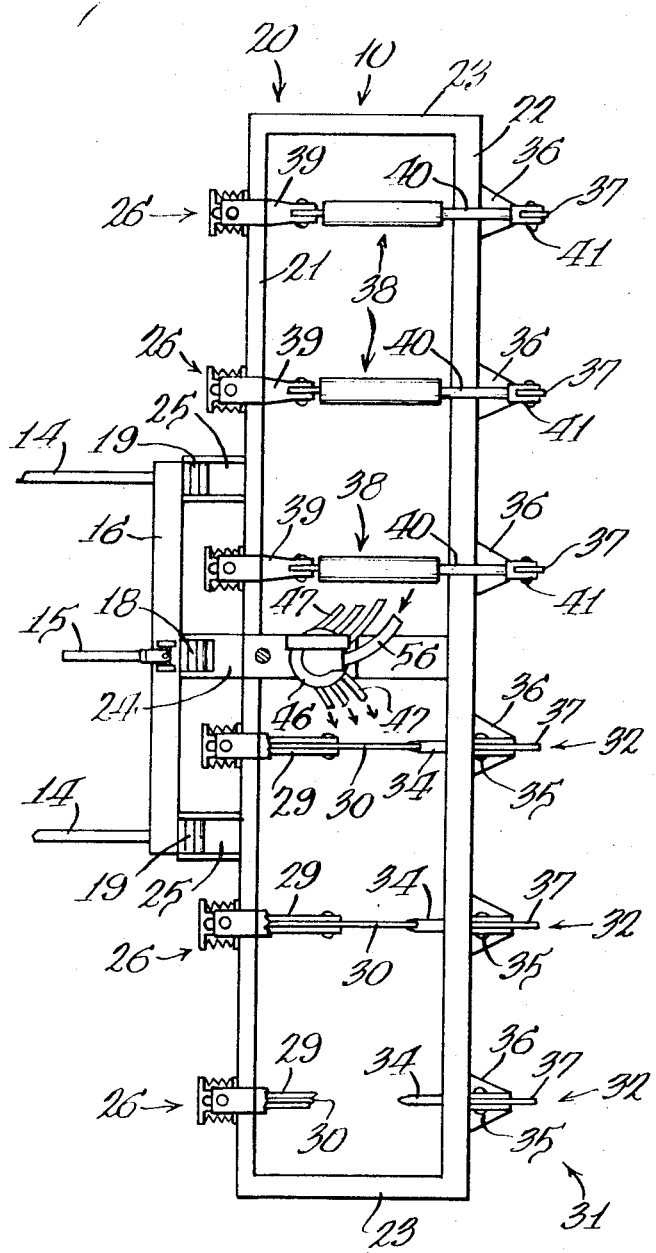

SOIL WORKING APPARATUS

BACKGROUND OF THE INVENTION

There are a number of agricultural operations in which it is desirable to have a soil working apparatus which is mounted on the lifting arms (commonly called the three point hitch) of a tractor, and some auxiliary means which is too large and heavy to carry on the three point hitch and thus properly should be on a trailing vehicle. A typical example is an ammonia applicator and a tank of liquid ammonia.

Heretofore there has been no adequate apparatus to meet the foregoing need. Units for application of ammonia or liquid fertilizer directly into the soil have generally used a rather small tank which may be carried on the same frame with the soil working means or on the back of the tractor. This is unsatisfactory for any large area.

The only device of which applicant is aware which provides auxiliary support for a tank is in Pechacek U.S. Pat. No. 3,526,342. There a wheeled cultivator is raised and lowered by hydraulic cylinders, and to minimize load on the cylinders a separate wheeled frame which spans the cultivator carries a liquid supply tank extending transversely above the cultivator. It is not readily adaptable to use with a tank which must extend longitudinally.

SUMMARY OF THE INVENTION

In accordance with the present invention, soil working apparatus includes a frame which may be mounted upon the lifting arms of a tractor, and soil working means in the form of a set of conventional discs and trailing pivotally mounted chisel points is mounted on the frame. Each of the chisel points is held in a normally upright position by an extended hydraulic cylinder and piston the line for which includes an overload relief valve so that if the chisel point strikes an obstruction in the soil it may pivot rearwardly as the extended piston rod is permitted to retract by discharge of hydraulic fluid from the cylinder through the pressure relief valve. As soon as the overload ceases the pressure of the tractor hydraulic system returns the piston to its extended position and the chisel point to its upright position.

Each chisel point is provided with conventional ammonia applicating means that is supplied through a distributor valve from a liquid ammonia supply tank that is carried on a trailer behind the soil working apparatus.

When the tractor lifting arms are elevated the discs and chisel points are clear of the ground for travel, while lowering of the lifting arms moves the disc and chisel points into engagement with the soil.

The trailer for the liquid ammonia tank is provided with a goose neck hitch that makes a pivotal draft connection with the tractor forward of the lifting arms. The goose neck hitch is of sufficient length and height to span the soil working apparatus from front to rear and clear it in all positions of the lifting arms, and to clear the ends of the frame when the tractor is turned at a right angle to the trailer.

The foregoing arrangement provides an extremely flexible apparatus which permits a large supply of liquid ammonia to be towed through a field behind the applicator apparatus; and permits the use of a standard large capacity liquid ammonia tank.

DESCRIPTION OF THE DRAWINGS

FIG. 1 is a perspective view of the apparatus of the present invention and the rear portion of a tractor with which it is used;

FIG. 2 is a longitudinal sectional view of the ammonia applicator, the tractor lifting arms and the portion of the trailer goose neck that spans the applicator and is pivotally connected to the tractor; and FIG. 3 is a plan view of the ammonia applicator.

DETAILED DESCRIPTION OF THE INVENTION

Referring to the drawings in greater detail, and referring first to FIG. 1, there is illustrated a soil working apparatus including a primary apparatus, indicated generally at 10, which is carried upon lift arms, indicated generally at 11, of a tractor T; and a trailer secondary unit, indicated generally at 12, which is pivotally connected to a draft connection 13 on the tractor T that is forward of the lift arms.

Referring to FIG. 2, the tractor lift arms include lower pivoted arms 14, an upper pivoted arm 15, and a mounting frame 16 which, together with the arms 14 and 15 and the chassis of the tractor T provides a four bar linkage which may be raised and lowered by an actuating linkage, indicated generally at 17, which is hydraulically driven. The tractor lifting arms, commonly known as a three point hitch because of the way in which an agricultural implement is hung on them, are of a type commonly used on farm tractors. An upper central hook 18 and a pair of lower side hooks 19 provided with conventional manual latches provide a three point mounting for suspending the primary soil working unit 10 in cantilever fashion on the lifting arms. The arms may be raised to lift primary unit clear of the ground or lowered to place the primary unit in a soil working position which is below that illustrated in FIG. 2 where its lowermost parts are flush with the ground.

As seen in FIGS. 2 and 3, the primary soil working unit 10 includes a rectangular frame, indicated generally at 20, having parallel front and rear cross bars 21 and 22 and parallel longitudinal frame end members 23. An upper central mounting bracket 24 and a pair of lower lateral mounting brackets 25 cooperate with the hooks 18 and 19 of the three point hitch to suspend the frame 20 as illustrated.

Mounted on the front bar 21 in uniform laterally spaced relationship are six conventional soil working disc assemblies, indicated generally at 26, each of which is best seen in FIG. 2 to include a mounting bracket 27, a depending arm 28, a vertically adjustable fork 29, and a disc 30.

An array of six soil erupting chisel point members, indicated generally at 31, is supported on the rear cross bar 22 with a chisel point member aligned behind each of the discs 30. Each of the chisel point members 32 includes an upright shank 33 at the lower end of which is a forwardly extending pointed soil erupting shoe 34, and the member 32 is pivotally mounted at 35 in a biforcated bracket 36 that extends rearwardly from the rear cross bar 22. A stablizing arm 37 which is integral with the shank 33 extends above the bracket 36; and a hydraulic cylinder and piston unit 38 is pivotally connected at its forward end to a bifurcated bracket 39 on the front cross bar 22 and has its rearwardly extending piston rod 40 pivotally connected at 41 to the upper end of the stabilizing arm 37. Each of the hydraulic cylinder and piston units 38 is connected to the tractor hydraulic system through hydraulic supply lines 42 and 43. The hydraulic cylinder and piston unit 38 normally occupies the extended position illustrated in the drawings, and an overload relief valve 44 in the line 43 permits the piston rod to retract and thus allows the chisel point member 32 to swing counterclockwise as seen in FIG. 2 if the shoe 34 strikes an obstruction such as a large rock. Once the obstruction is passed the hydraulic system recharges the cylinder through the line 42 and returns the piston rod 40 to its extended position.

The unit 10 also includes ammonia applicator means, indicated generally at 45, that includes a centrally mounted regulator valve 46 from which six supply lines 47 are connected to pipes 48 and ammonia nozzles 49 at the rear of the chisel shanks 33.

Turning now to the seconary unit 12, there is a trailer frame 50 supported on tandem wheels 51, and at the forward end of the trailer frame 50 is a goose neck hitch 52 which arches high over the primary apparatus 10 and has at its forward end a vertical socket arm 53 which makes a conventional ball and socket connection with a ball 54 which is part of the draft connection 13 on the tractor T. As seen in FIGS. 1 and 2, the goose neck hitch 52 is long enough to span the primary apparatus 10 from front to rear and high enough that it does not interfere with movement of the primary apparatus to an elevated travelling position as heretofore described. Further, the length of the goose neck hitch is such that if the tractor is turned at right angles to the longitudinal line of the trailer there is no interference between the front of the trailer frame 50 and the end of the rectangular frame 20 in any position of the tractor lift arms 11.

Mounted on the trailer frame 50 is a standard liquid ammonia tank 55 which has an ammonia supply line 56 through which liquid ammonia is admitted to the regulator valve 46. The liquid ammonia tank 55 and its connections to the supply line 56, as well as the entire ammonia applicator system 45, are conventional and form no part of the present invention. The ammonia tank and its connecting line 56 constitute auxiliary means which cooperates with primary apparatus 10.

The foregoing detailed description is given for clearness of understanding only and no unnecessary limitations should be understood therefrom, as modifications will be obvious to those skilled in the art.

I claim:

1. In an agricultural apparatus for applying fluid material to freshly erupted soil, having a farm tractor, a tool carrier of substantial length and breadth, mounted on the rear lifting arms of said farm tractor, with laterally spaced soil erupting members mounted on said tool carrier and applicator means immediately to the rear of each soil erupting member, and a trailer vehicle having a supply of fluid material thereon, with conduit connections for said applictor means to receive fluid material from said supply of fluid material, said soil erupting members engaging the soil when the tractor arms are lowered and being clear of the soil when said arms are raised, the improvement in said trailing vehicle comprising:

a wheeled chassis;

a large capacity, longitudinally elongated fluid material container mounted on said chassis to contain the supply of fluid material for the applicator means;

a gooseneck hitch at the front of the chassis which is of sufficient length and height to span the tool carrier from front to rear and clear the tool carrier in all positions of the lifting arms, and to clear the ends of the tool carrier frame when the tractor is turned at a right angle to the length of the container;

means at the front of the gooseneck hitch making a pivotal connection to a tractor draft connection forward of the lifting arms;

and conduit means connecting the container to the applicator conduit connections, whereby a large quantity of fluid material may be moved through a field by a farm tractor and applied to freshly erupted soil.

2. The apparatus of claim 1 in which the container is a standard liquid ammonia tank.

* * * * *